United States Patent
Galestien

(10) Patent No.: US 11,162,771 B2
(45) Date of Patent: Nov. 2, 2021

(54) METHOD AND APPARATUS FOR MEASURING DIAMETERS OF CYLINDRICAL MEASURING PINS

(71) Applicant: Reginald Galestien, Emmen (NL)

(72) Inventor: Reginald Galestien, Emmen (NL)

(*) Notice: Subject to any disclaimer, the term of this patent is extended or adjusted under 35 U.S.C. 154(b) by 0 days.

(21) Appl. No.: 16/957,857

(22) PCT Filed: Jan. 22, 2018

(86) PCT No.: PCT/NL2018/050043
§ 371 (c)(1),
(2) Date: Jun. 25, 2020

(87) PCT Pub. No.: WO2019/143236
PCT Pub. Date: Jul. 25, 2019

(65) Prior Publication Data
US 2021/0041217 A1 Feb. 11, 2021

(51) Int. Cl.
*G01B 5/08* (2006.01)
*G01B 5/00* (2006.01)

(52) U.S. Cl.
CPC ............. *G01B 5/08* (2013.01); *G01B 5/0004* (2013.01)

(58) Field of Classification Search
CPC ................................ G01B 5/08; G01B 5/0004
USPC .......................................................... 33/503
See application file for complete search history.

(56) References Cited

U.S. PATENT DOCUMENTS

| | | | | |
|---|---|---|---|---|
| 4,774,753 A * | 10/1988 | Holy | ...................... | B23Q 17/20 33/504 |
| 4,800,652 A * | 1/1989 | Ballas | .................. | G01B 5/0002 33/504 |
| 5,068,974 A * | 12/1991 | Possati | ...................... | G01B 7/12 33/549 |
| 6,047,479 A | 4/2000 | Galestien | | |
| 6,568,096 B1 * | 5/2003 | Svitkin | .................... | B23Q 1/76 33/501.02 |
| 7,036,238 B2 | 5/2006 | Kojima et al. | | |
| 8,393,087 B2 * | 3/2013 | Tanida | .................... | G01B 5/163 33/555.1 |

(Continued)

FOREIGN PATENT DOCUMENTS

| | | | |
|---|---|---|---|
| EP | 0869328 A2 | 10/1998 | |
| EP | 1548395 B1 | 6/2010 | |

(Continued)

*Primary Examiner* — Yaritza Guadalupe-McCall
(74) *Attorney, Agent, or Firm* — Pearne & Gordon LLP

(57) ABSTRACT

The invention provides a solution according to which the diameters of a large plurality of cylindrical measuring pins (1A-1E) can be measured fast and accurately, while using an affordable, non-complex and universally applicable measuring apparatus. In concise summary, the key features of the invention are formed by using a two-dimensional tracing apparatus (10) having a simultaneous holding structure (12) for simultaneously holding the measuring pins in fixed positions relative to the apparatus frame (11), while the measuring pins are alongside one another with their central axes parallel to one another, and by performing first and second joint tracing operations by tracing against and along diametrically opposite first and second parts of first and second circular sections of the cylindrical outer surfaces of the measuring pins, to thereby determine measured values of the diameters.

8 Claims, 8 Drawing Sheets

(56) References Cited

U.S. PATENT DOCUMENTS

| | | | |
|---|---|---|---|
| 8,925,367 B2 | 1/2015 | Omori et al. | |
| 9,587,928 B2* | 3/2017 | Przygodda | G01B 11/005 |
| 9,658,085 B2* | 5/2017 | Dastugue | G01B 5/12 |
| 10,288,404 B2* | 5/2019 | Nakamori | G01B 5/202 |
| 2003/0051360 A1* | 3/2003 | Galestien | G01B 3/38 33/520 |
| 2005/0066534 A1* | 3/2005 | Matsuda | G01B 21/042 33/502 |
| 2005/0132591 A1 | 6/2005 | Kojima et al. | |
| 2007/0100554 A1* | 5/2007 | Kawai | G01B 21/20 702/1 |
| 2011/0146095 A1 | 6/2011 | Tanida et al. | |
| 2012/0234075 A1 | 9/2012 | Omori et al. | |
| 2019/0368853 A1* | 12/2019 | Galestien | G01B 5/008 |
| 2020/0249006 A1* | 8/2020 | Dall'Aglio | B24B 49/045 |
| 2021/0041217 A1* | 2/2021 | Galestien | G01B 5/08 |

FOREIGN PATENT DOCUMENTS

| | | |
|---|---|---|
| EP | 2500684 B1 | 6/2014 |
| JP | H03131419 A | 6/1991 |

\* cited by examiner

METHOD AND APPARATUS FOR MEASURING DIAMETERS OF CYLINDRICAL MEASURING PINS

The invention relates to a method and an apparatus for measuring respective diameters of respective cylindrical measuring pins.

Cylindrical measuring pins are high-precision testing gauges with a tolerance of for example ±1 μm. They are simple to use and very suitable for measuring tests on work pieces in manufacture, e.g. for testing bore holes. FIG. 1 illustrates an example of such a cylindrical measuring pin 1A, having diameter 2A, central axis 3A and cylindrical outer surface 4A.

Usually cylindrical measuring pins are available in storage cases. Such a storage case typically contains a large set of many cylindrical measuring pins, all having different diameters in a certain diameter range. For example, a storage case may contain 100 cylindrical measuring pins having diameters that differentiate relative to one another in steps of 0.05 mm from a largest diameter of 10.00 mm to a smallest diameter of 5.05 mm. FIG. 2 illustrates an example of five such cylindrical measuring pins 1A-1E, having different diameters 2A-2E, central axes 3A-3E and cylindrical outer surfaces 4A-4E.

Every once in a while such a set of cylindrical measuring pins has to be calibrated in that the diameters of all cylindrical measuring pins of the set have to be accurately measured. Preferably this is done by using an affordable, non-complex and universally applicable measuring apparatus.

As illustrated in FIG. 3, it is known to measure the diameter of such a cylindrical measuring pin by using a two-point measurement in a universal single-axis length measuring machine 100. In FIG. 3 a measurement technician has manually placed the cylindrical measuring pin 1A of FIG. 1 in-between the measuring points 101 and 102 of the machine 100. On its right side the measuring pin 1A is touched by the fixed measuring point 101. On its left side the measuring pin 1A is touched by the movable measuring point 102, under the action of the measuring force 103. The position of the movable measuring point 102 is measured by the linear measuring system 104 having the linear guide 105. The measured diameter 2A of the measuring pin 1A is determined as the distance between the measuring points 101 and 102. The measured diameter 2A is displayed on the display 106 of the machine 100.

This known measuring method based on the universal single-axis length measuring machine 100 has some drawbacks. One drawback is that the accuracy of the universal single-axis length measuring machine highly depends on the skills and proficiency of the measurement technician. Furthermore, measuring the diameter of one measuring pin typically takes a few minutes (e.g. five minutes). This means that measuring the diameters of a set of for example 100 measuring pins may take many hours. A further drawback is that the measurement of the diameter is done at only one pair of mutually opposite positions at the outer surface of the measuring pin.

It is an object of the invention to provide a solution according to which, for large sets of cylindrical measuring pins, the diameters of the measuring pins can be measured faster and more accurately, while still using an affordable, non-complex and universally applicable measuring apparatus.

For that purpose the invention provides a method according to the appended independent claim 1, as well as an apparatus according to the appended independent claim 5. Preferable embodiments of the invention are provided by the appended dependent claims 2-4 and 6-8.

Hence, the invention provides a method for measuring respective diameters of respective cylindrical measuring pins, said respective cylindrical measuring pins comprising respective central axes and respective cylindrical outer surfaces, the method comprising the steps of:

providing a two-dimensional tracing apparatus comprising:
  an apparatus frame,
  a simultaneous holding structure connected to said apparatus frame and comprising respective clamps configured for effecting a simultaneous holding condition, in which the respective clamps are simultaneously clamping on to the respective cylindrical measuring pins, thereby holding the respective cylindrical measuring pins in respective fixed positions relative to the apparatus frame, while the respective cylindrical measuring pins are alongside one another with their respective central axes parallel to one another,
  a tracing structure connected to said apparatus frame and comprising a first tracing point and a second tracing point,
  a driving structure, which is configured for effecting that in said simultaneous holding condition the first tracing point is performing a first joint tracing operation by tracing against and along respective first circular sections of the respective cylindrical outer surfaces of the respective cylindrical measuring pins in a first plane which is perpendicular to the central axes, and which is configured for effecting that in said simultaneous holding condition the second tracing point is performing a second joint tracing operation by tracing against and along respective second circular sections of the respective cylindrical outer surfaces of the respective cylindrical measuring pins in a second plane which is perpendicular to the central axes, wherein at least respective first parts of the respective first circular sections are diametrically opposite to at least respective second parts of the respective second circular sections, as seen relative to the respective central axes,
  a detecting structure, which is configured for detecting first relative positions of the first tracing point relative to the apparatus frame, and which is configured for detecting second relative positions of the second tracing point relative to the apparatus frame,
  a processor, which is configured for determining respective measured values of said respective diameters based on said detecting of said first relative positions of the first tracing point during said first joint tracing operation, and based on said detecting of said second relative positions of the second tracing point during said second joint tracing operation,
effecting said simultaneous holding condition,
performing said first joint tracing operation,
performing said second joint tracing operation,
determining, by said processor, said respective measured values of said respective diameters.

In concise summary, the key features of the invention are formed by using a two-dimensional tracing apparatus having said simultaneous holding structure, to thereby perform said first and second joint tracing operations by tracing against and along said diametrically opposite first and second parts of the first and second circular sections, to thereby determine the measured values of the diameters of the measuring pins in said simultaneous holding condition. It is noted that a two-dimensional tracing apparatus is an affordable, non-complex and universally applicable measuring apparatus. Thanks to said simultaneous holding structure enabling to trace against and along the diametrically opposite circular sections for multiple measuring pins jointly, the diameters of the multiple measuring pins are measured fast and accurately.

For example, if the simultaneous holding structure is configured for simultaneously clamping on to 10 cylindrical measuring pins, measuring the diameters of a large set of for example 100 measuring pins may be done almost a factor 10 times faster than with the abovementioned known measuring method based on the universal single-axis length measuring machine. Furthermore, as compared to the abovementioned known measuring method, the present invention additionally provides a higher accuracy since each diameter measurement is not based on a pair of diametrically opposite single points, but instead is based on a pair of diametrically opposite circular sections. This means that each diameter measurement may for example be based on a mathematical best-fit algorithm, according to which the measured diameter is determined to be the diameter of a circle that best fits the pair of diametrically opposite circular sections.

In a preferable embodiment of the invention the simultaneous holding structure is an exchangeable module of the two-dimensional tracing apparatus in that the simultaneous holding structure is detachable from the apparatus frame and attachable to the apparatus frame by a user of the two-dimensional tracing apparatus. This exchangeable character of the simultaneous holding structure allows the (affordable and non-complex) two-dimensional tracing apparatus to remain universally applicable. This not only holds for many various other measuring purposes, e.g. related to measuring totally different objects than measuring pins, but also holds for various measuring purposes related to measuring multiple measuring pins, as according to the present invention. For example, it is possible to have available a stock of various different simultaneous holding structures as exchangeable modules, each of which is specifically designed for example for clamping on to different kinds of measuring pins and/or on to different numbers of measuring pins.

More preferably, the simultaneous holding structure is configured such that:

the user can mount the respective cylindrical measuring pins to the simultaneous holding structure when the simultaneous holding structure is detached from the apparatus frame, and said simultaneous holding condition is automatically effected when the user subsequently attaches the simultaneous holding structure, together with the respective cylindrical measuring pins mounted thereto, to the apparatus frame.

This way it becomes possible to pre-mount multiple measuring pins to one or more of the exchangeable modules prior to attaching the one or more exchangeable modules to the apparatus frame. This further increases the speed of measuring multiple measuring pins. For example, during the time when a first multiplicity of measuring pins mounted to a first exchangeable simultaneous holding structure is being measured in the apparatus, a measurement technician may already pre-mount a second multiplicity of measuring pins to a second exchangeable simultaneous holding structure. And so on, for further multiplicities of measuring pins. This way the measurement technician and the apparatus can work in parallel with one another, thereby increasing the speed and efficiency of the job approximately by a yet further factor 2.

In a further preferable embodiment of the invention, the position of the simultaneous holding structure relative to the apparatus frame is adjustable in an axial direction of the two-dimensional tracing apparatus, wherein said axial direction is defined as being parallel to said central axes, as seen in said simultaneous holding condition. This allows to quickly perform diameter measurements at various different axial positions along the central axes of the measuring pins.

The abovementioned aspects and other aspects of the invention will be apparent from and elucidated with reference to the embodiments described hereinafter by way of non-limiting examples only and with reference to the schematic figures in the enclosed drawing.

The reference signs used in FIGS. 1-8 are referring to the abovementioned parts and aspects of the present invention, as well as to related parts and aspects, in the following manner. Throughout FIGS. 1-8 like reference signs are referring to like parts and aspects.

Figure 1:
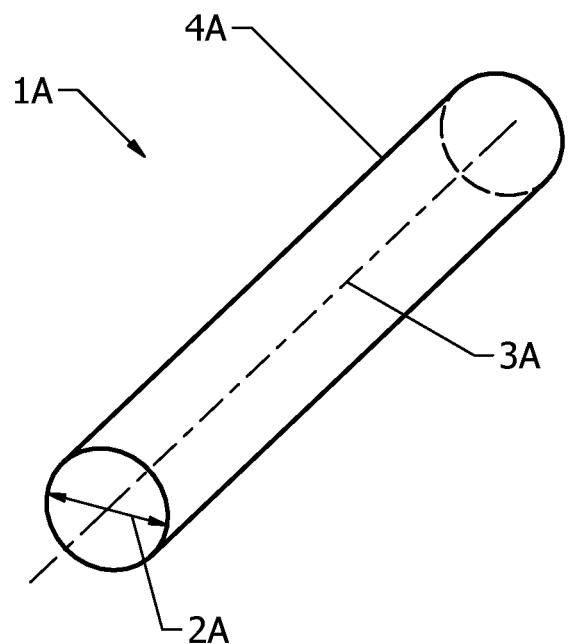
FIG. 1 shows in a perspective view an example of a cylindrical measuring pin for use in connection with the present invention.
Figure 2:
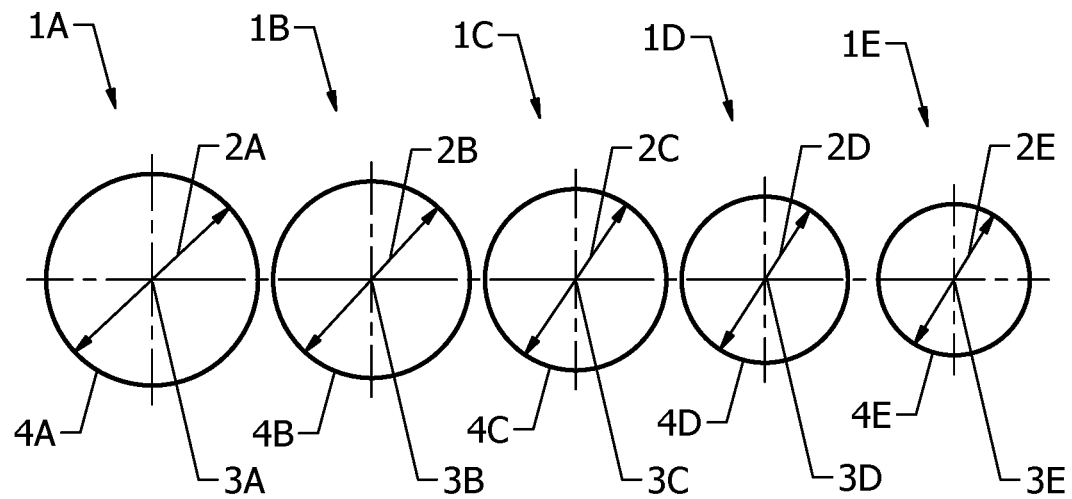
FIG. 2 shows an example of a set of cylindrical measuring pins having different diameters.
Figure 3:
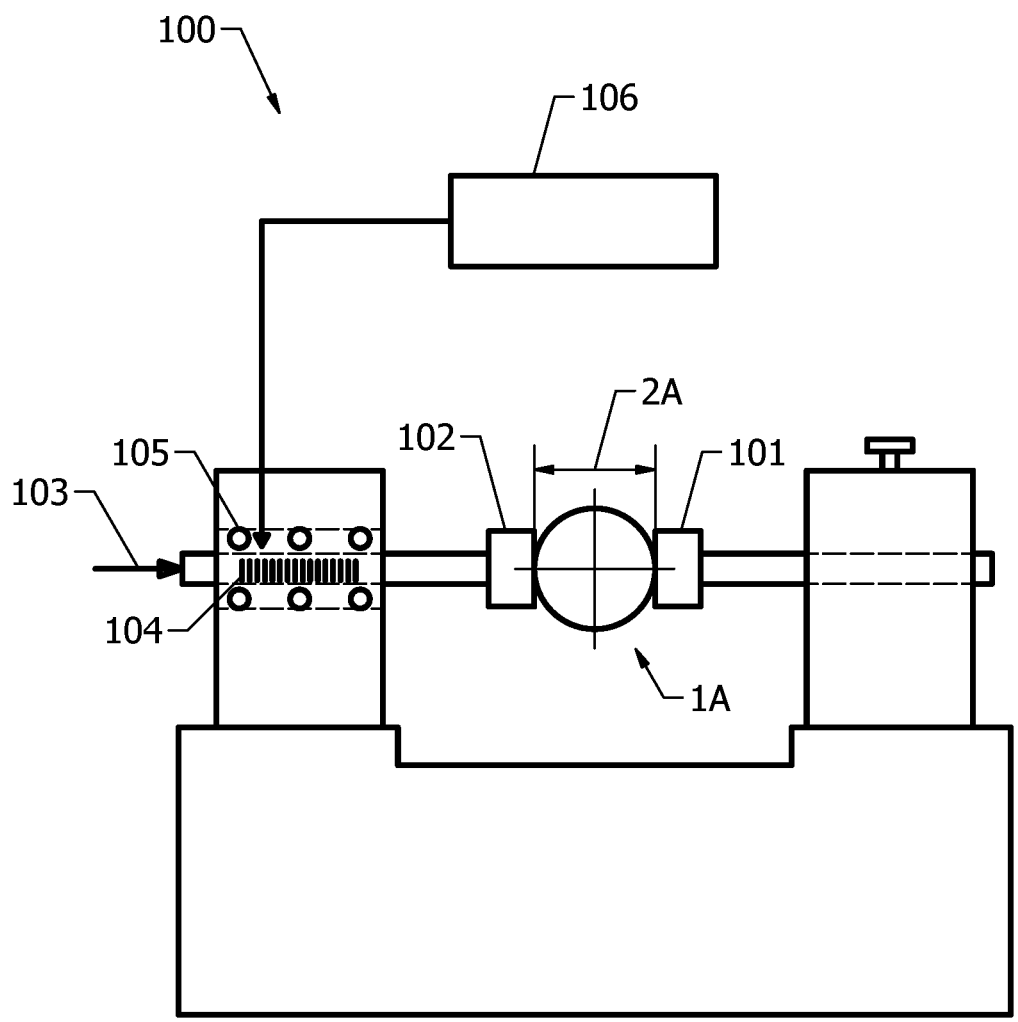
FIG. 3 illustrates, as known in the prior art, the measuring of a diameter of a cylindrical measuring pin by using a two-point measurement in a universal single-axis length measuring machine.

1A-1J cylindrical measuring pin
1K-1L accurately calibrated setting-standard pin
2A-2E diameter
3A-3E central axis
4A-4E cylindrical outer surface
10 two-dimensional tracing apparatus
11 apparatus frame
12 simultaneous holding structure
14A-14F clamp
15 tracing structure
16A-16B driving structure
17A-17C detecting structure
18 processor 21 first tracing point
22 second tracing point
23 holder of the apparatus frame
24 backplane of the simultaneous holding structure
25 tracing arm
26 hinge axis
27 scanning unit
28 horizontal guide
29 vertical guide
31 controlled downwards pressing force
32 controlled upwards pressing force
41 lower horizontal beam
42 upper horizontal beam
51 first graph of respective first circular sections
52 second graph of respective second circular sections Based on the above introductory description, including the above brief description of the drawing figures, and based on the above-explained reference signs used in the drawing, the shown examples of FIGS. 1-8 are for the greatest part readily self-explanatory. The following extra explanations are given.

The hatched parts in FIGS. 4, 5, 6, 8 are indicating the apparatus frame 11 of the two-dimensional tracing apparatus 10. In FIGS. 4, 5, 6, 8 it is seen that the apparatus frame 11 comprises the holder 23. This holder 23 is configured for connection with the backplane 24 (see FIGS. 5, 6, 8) of the simultaneous holding structure 12 in order to effect the abovementioned simultaneous holding condition.

Figure 4:
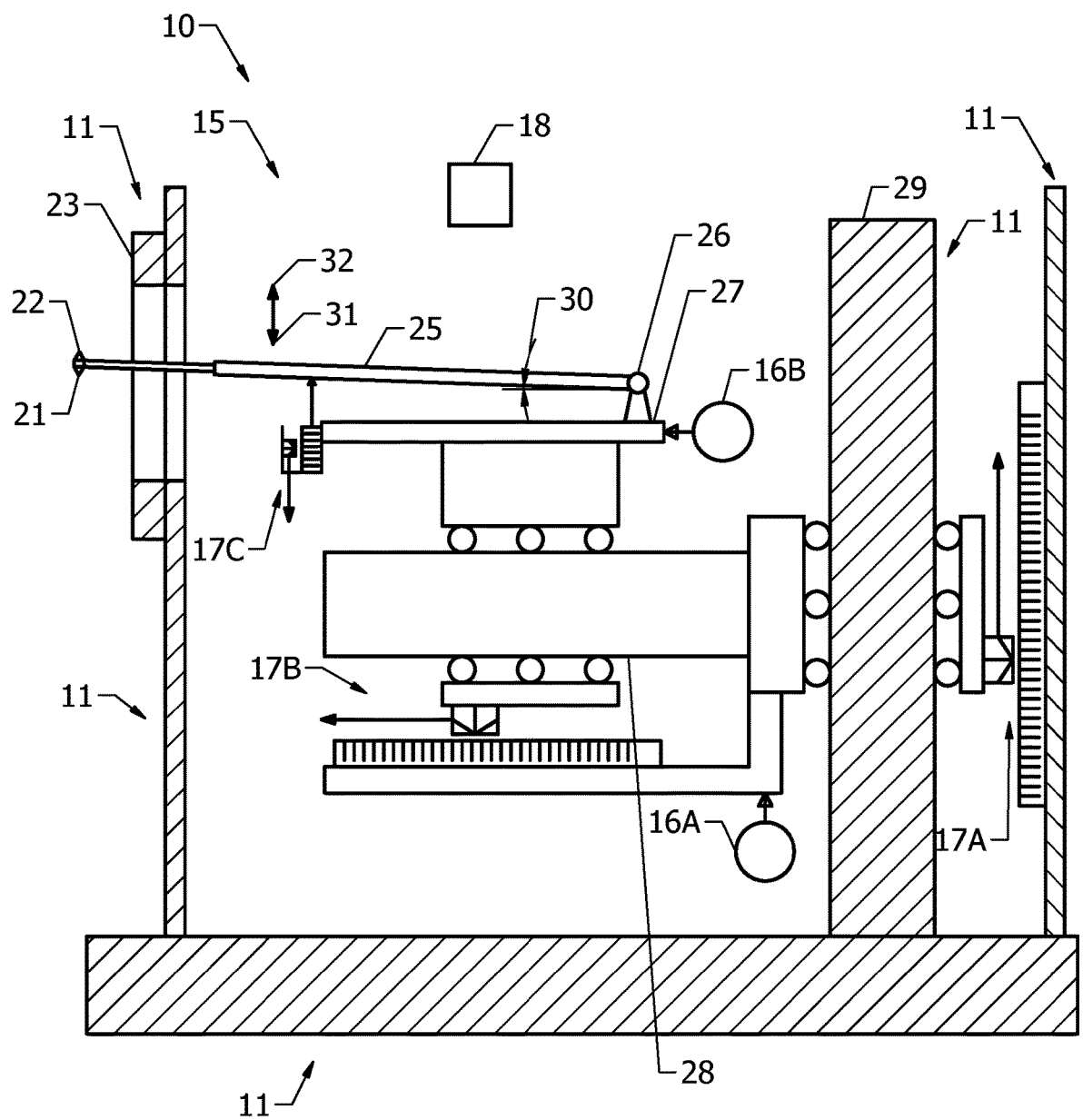
FIG. 4 shows an example of an embodiment of a two-dimensional tracing apparatus according to the present invention, wherein the simultaneous holding structure of the two-dimensional tracing apparatus is not shown in FIG. 4, but is separately shown in FIG. 5.

FIG. 4 shows the tracing structure 15 of the two-dimensional tracing apparatus 10. The tracing structure 15 comprises the two-sided tracing arm 25, which has the first tracing point 21 and the second tracing point 22. The tracing arm 25 is rotatable around the hinge axis 26, which is mounted on the scanning unit 27. The scanning unit 27 is horizontally moveable by the shown first motor 16B over the horizontal guide 28, which is vertically moveable by the shown second motor 16A over the vertical guide 29. The first motor 16B and the second motor 16A are part of the abovementioned driving structure of the two-dimensional tracing apparatus 10.

During tracing operations performed with the first tracing point 21 of the tracing arm 25, the first tracing point 21 will be pressed with a controlled downwards pressing force 31 (see FIG. 4) against a measuring object concerned. During tracing operations performed with the second tracing point 22 of the tracing arm 25, the second tracing point 22 will be pressed with a controlled upwards pressing force 32 (see FIG. 4) against a measuring object concerned.

During tracing operations, the rotation angle 30 of the tracing arm 25 relative to the scanning unit 27 is detected by means of the first reader/signal-output device 17C of the detecting structure of the apparatus 10. At the same time the horizontal position of the scanning unit 27 relative to the horizontal guide 28 is detected by means of the second reader/signal-output device 17B of the detecting structure of the apparatus 10, while the vertical position of the horizontal guide 28 relative to the vertical guide 29 is detected by means of the third reader/signal-output device 17A of the detecting structure of the apparatus 10.

Figure 5:
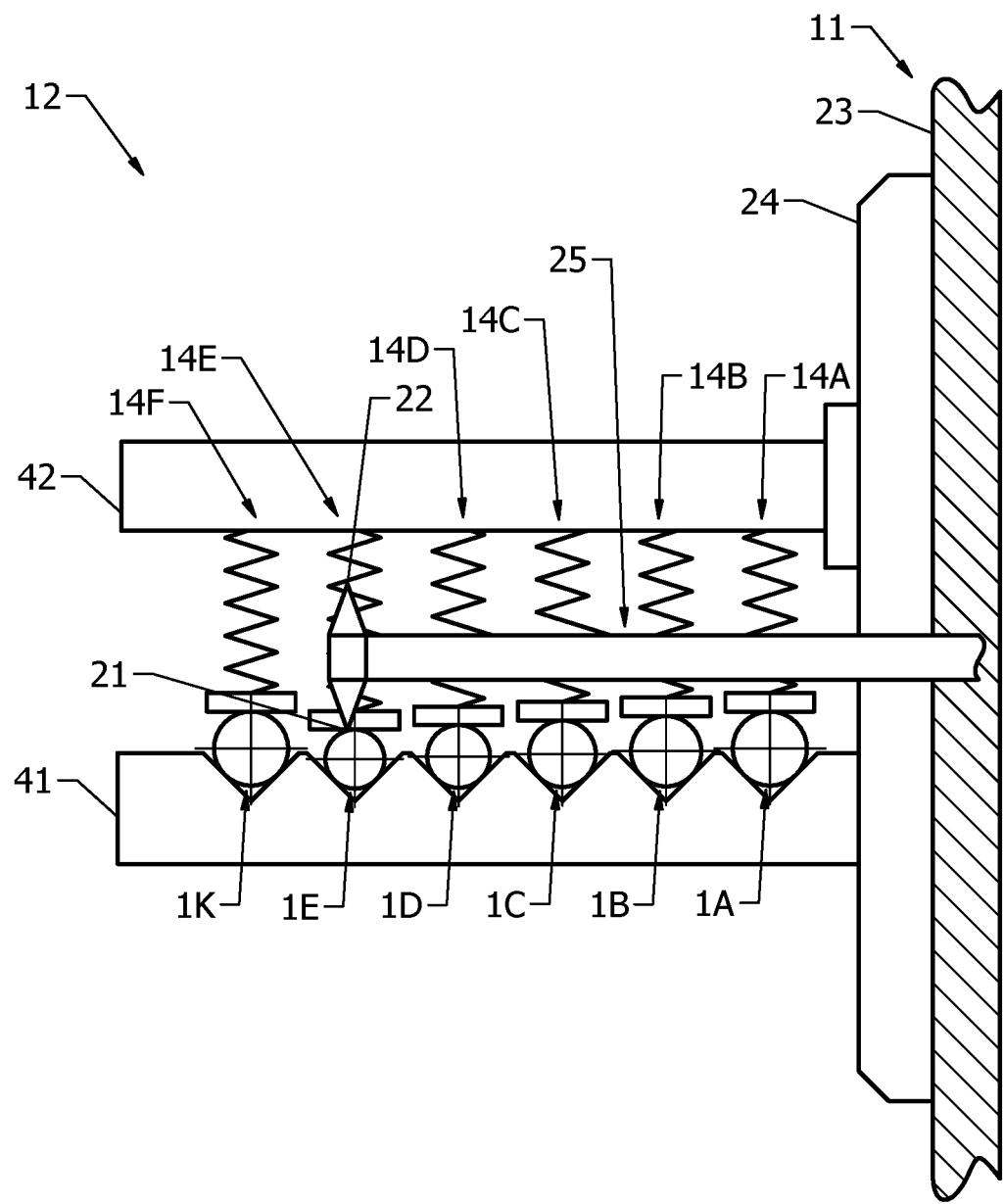
FIG. 5 shows a detail of an example of an embodiment of a simultaneous holding structure being connected to the apparatus frame of the two-dimensional tracing apparatus of FIG. 4, wherein in the situation of FIG. 5 the abovementioned simultaneous holding condition is effective for the respective cylindrical measuring pins of FIG. 2 while performing the abovementioned first joint tracing operation.
Figure 6:
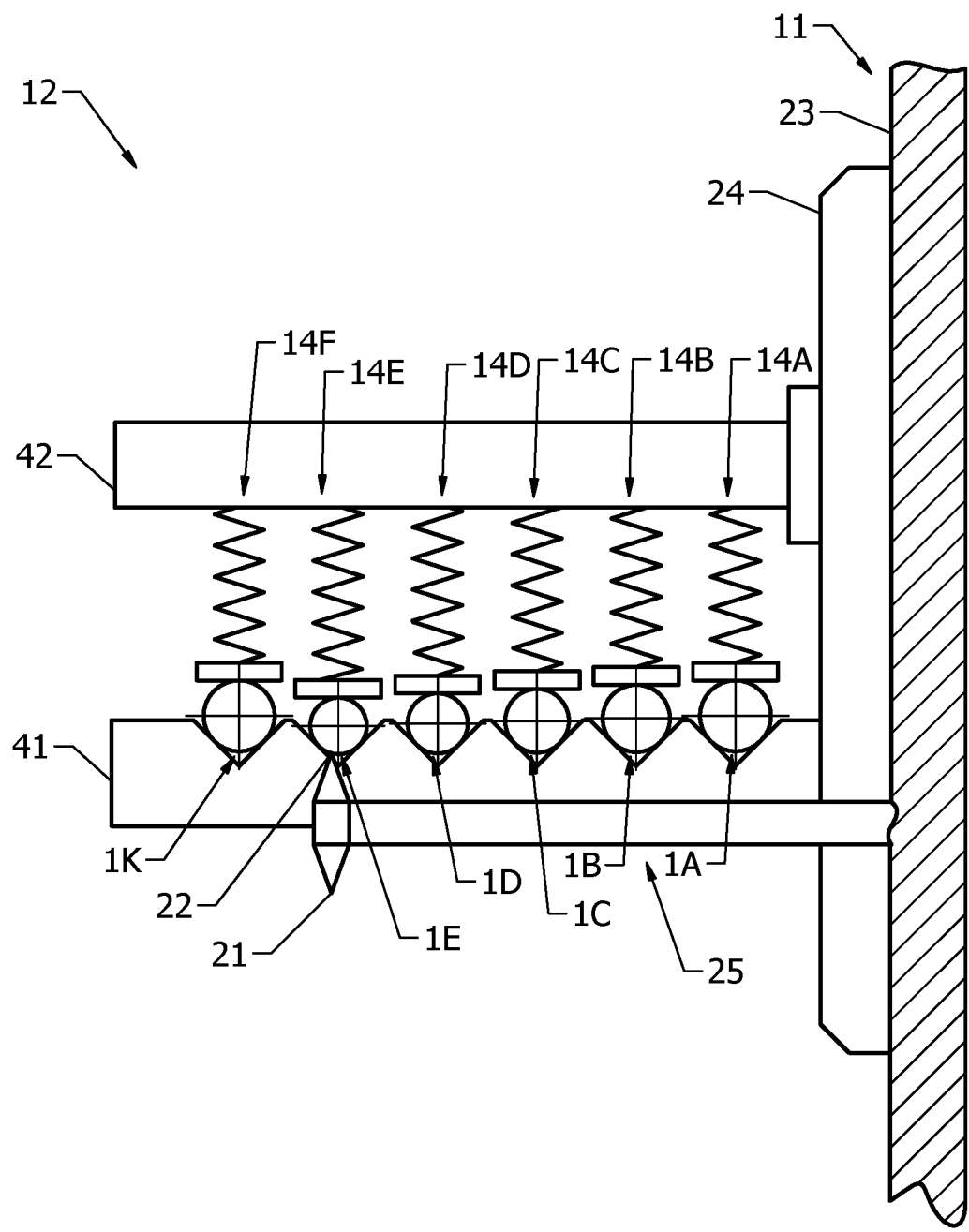
FIG. 6 shows the detail and situation of FIG. 5 again, however, this time while performing the abovementioned second joint tracing operation instead of the first joint tracing operation of FIG. 5.

It is noted that the views of FIGS. 4, 5, 6, 8 are with a viewing direction along the abovementioned axial direction, i.e. parallel to the central axes of the cylindrical measuring pins, as considered in the simultaneous holding condition. Furthermore it is noted that FIGS. 5, 6 show the lower horizontal beam 41 and the upper horizontal beam 42 of the simultaneous holding structure 12, while the two-sided tracing arm 25 is depicted in front of the shown pair of beams 41, 42 as seen from the viewers point. It has to be understood that the simultaneous holding structure 12 has in fact two identical pairs of these beams 41, 42. These pairs are mutually spaced in the axial direction, while the two-sided tracing arm 25 is located somewhere axially in-between the two pairs of beams 41, 42. FIGS. 5, 6 only show the axially farthest pair of beams 41, 42 together with the two-sided tracing arm 25 axially in front thereof.

In FIG. 5 it is seen that, in the shown example, each of the clamps 14A-14F of the simultaneous holding structure 12 is formed by a V-shaped groove in each lower horizontal beam 41 in combination with a pusher spring suspended from each upper horizontal beam 42. In the situation of FIG. 5 the clamps 14A-14E are clamping on to the cylindrical measuring pins 1A-1E, respectively, while the clamp 14F is clamping on to the accurately calibrated setting-standard pin 1K. This accurately calibrated setting-standard pin 1K is a cylindrical pin which has an accurately certified diameter. When performing the abovementioned first and second joint tracing operations, as illustrated by FIGS. 5 and 6, also the setting-standard pin 1K may be traced jointly with the cylindrical measuring pins 1A-1E. Incorporating the setting-standard pin 1K in these scanning processes enables the processor 18 to apply suitable fine-tuning settings when determining the respective measured values of the respective diameters 2A-2E of the cylindrical measuring pins 1A-1E, for example to compensate for situations in which the distance between the first tracing point 21 and the second tracing point 22 is not known accurately enough.

Figure 7:
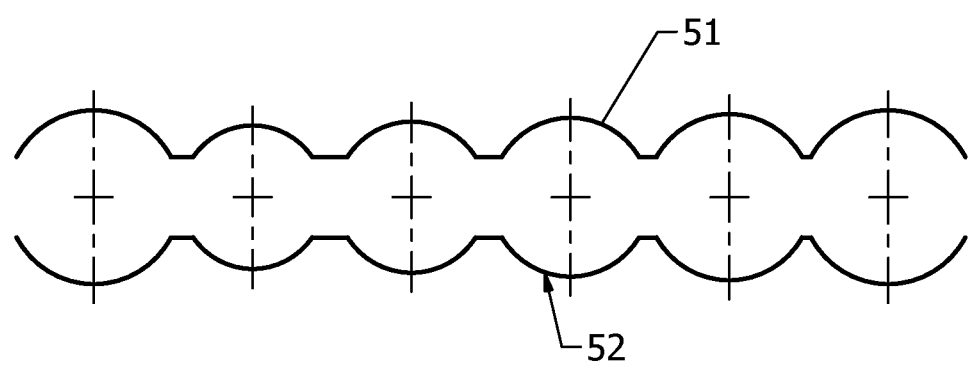
FIG. 7 shows a first graph of the abovementioned respective first circular sections detected during the first joint tracing operation of FIG. 5, in combination with a second graph of the abovementioned respective second circular sections detected during the second joint tracing operation of FIG. 6.

FIG. 7 shows the first graph 51 of the first circular sections of the cylindrical pins 1A-1E and 1K detected during the first joint tracing operation performed by the first tracing point 21, as shown in FIG. 5. FIG. 7 additionally shows the second graph 52 of the second circular sections of the cylindrical pins 1A-1E and 1K detected during the second joint tracing operation performed by the second tracing point 22, as shown in FIG. 6. Based on these first and second graphs 51 and 52, the processor 18 determines the measured values of the diameters 2A-2E of the cylindrical measuring pins 1A-1E, for example based on a mathematical best-fit algorithm, according to which each measured value is determined to be the diameter of a circle that best fits the pair of diametrically opposite first and second circular sections concerned.

Figure 8:
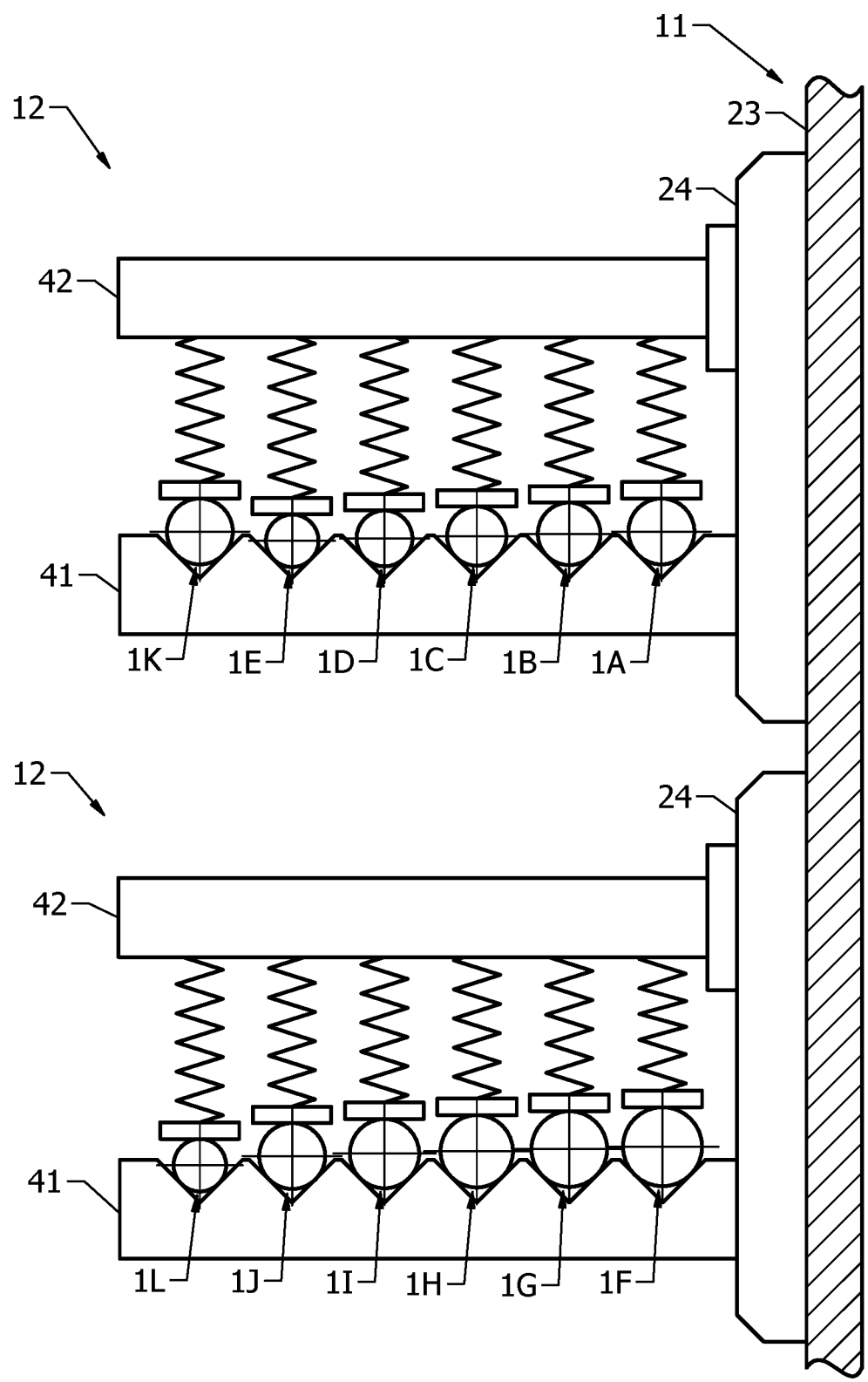
FIG. 8 shows a detail of an example of another embodiment of a two-dimensional tracing apparatus according to the present invention, wherein two simultaneous holding structures are simultaneously connected to the apparatus frame of the two-dimensional tracing apparatus of FIG. 4.

FIG. 8 shows a situation in which two identical specimens of the holding structure 12 of FIGS. 5 and 6 are simultaneously connected with their backplanes 24 to the holder 23 of the apparatus frame 11 of the two-dimensional tracing apparatus 10 of FIG. 4. The upper one of these two holding structures 12 is holding the first multiplicity of cylindrical measuring pins 1A-1E, together with the accurately calibrated setting-standard pin 1K. The lower one of the two holding structures 12 is holding the second multiplicity of cylindrical measuring pins 1F-1J, together with the accurately calibrated setting-standard pin 1L.

While the invention has been described and illustrated in detail in the foregoing description and in the drawing figures, such description and illustration are to be considered exemplary and/or illustrative and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. For the purpose of clarity and a concise description, features are disclosed herein as part of the same or separate embodiments, however, it will be appreciated that the scope of the invention may include embodiments having combinations of all or some of the features disclosed.

The mere fact that certain measures are recited in mutually different dependent claims does not indicate that a combination of these measures can not be used to advantage. Any reference signs in the claims should not be construed as limiting the scope.

The invention claimed is:

1. A method for measuring respective diameters (2A-2E) of respective cylindrical measuring pins (1A-1E), said respective cylindrical measuring pins comprising respective central axes (3A-3E) and respective cylindrical outer surfaces (4A-4E), the method comprising the steps of:

providing a two-dimensional tracing apparatus (10) comprising:
an apparatus frame (11),
a simultaneous holding structure (12) connected to said apparatus frame and comprising respective clamps (14A-14E) configured for effecting a simultaneous holding condition, in which the respective clamps are simultaneously clamping on to the respective cylindrical measuring pins, thereby holding the respective cylindrical measuring pins in respective fixed positions relative to the apparatus frame, while the respective cylindrical measuring pins are alongside one another with their respective central axes parallel to one another,
a tracing structure (15) connected to said apparatus frame and comprising a first tracing point (21) and a second tracing point (22),
a driving structure (16A-16B), which is configured for effecting that in said simultaneous holding condition the first tracing point is performing a first joint tracing operation by tracing against and along respective first circular sections of the respective cylindrical outer surfaces of the respective cylindrical measuring pins in a first plane which is perpendicular to the central axes, and which is configured for effecting that in said simultaneous holding condition the second tracing point is performing a second joint tracing operation by tracing against and along respective second circular sections of the respective cylindrical outer surfaces of the respective cylindrical measuring pins in a second plane which is perpendicular to the central axes, wherein at least respective first parts of the respective first circular sections are diametrically opposite to at least respective second parts of the respective second circular sections, as seen relative to the respective central axes,
a detecting structure (17A-17C), which is configured for detecting first relative positions of the first tracing point (21) relative to the apparatus frame (11), and which is configured for detecting second relative positions of the second tracing point (22) relative to the apparatus frame (11),
a processor (18), which is configured for determining respective measured values of said respective diameters based on said detecting of said first relative positions of the first tracing point during said first joint tracing operation, and based on said detecting of said second relative positions of the second tracing point during said second joint tracing operation,
effecting said simultaneous holding condition,
performing said first joint tracing operation,
performing said second joint tracing operation,
determining, by said processor, said respective measured values of said respective diameters.

2. A method according to claim 1, wherein the simultaneous holding structure (12) is an exchangeable module of the two-dimensional tracing apparatus (10) in that the simultaneous holding structure is detachable from the apparatus frame (11) and attachable to the apparatus frame (11) by a user of the two-dimensional tracing apparatus.

3. A method according to claim 2, wherein the simultaneous holding structure (12) is configured such that:
the user can mount the respective cylindrical measuring pins (1A-1E) to the simultaneous holding structure when the simultaneous holding structure is detached from the apparatus frame (11), and
said simultaneous holding condition is automatically effected when the user subsequently attaches the simultaneous holding structure, together with the respective cylindrical measuring pins (1A-1E) mounted thereto, to the apparatus frame (11).

4. A method according to claim 1, wherein the position of the simultaneous holding structure (12) relative to the apparatus frame (11) is adjustable in an axial direction of the two-dimensional tracing apparatus (10), wherein said axial direction is defined as being parallel to said central axes (3A-3E), as seen in said simultaneous holding condition.

5. An apparatus (10) for measuring respective diameters (2A-2E) of respective cylindrical measuring pins (1A-1E), said respective cylindrical measuring pins comprising respective central axes (3A-3E) and respective cylindrical outer surfaces (4A-4E), wherein the apparatus is a two-dimensional tracing apparatus comprising:
an apparatus frame (11),
a simultaneous holding structure (12) connected to said apparatus frame and comprising respective clamps (14A-14E) configured for effecting a simultaneous holding condition, in which the respective clamps are simultaneously clamping on to the respective cylindrical measuring pins, thereby holding the respective cylindrical measuring pins in respective fixed positions relative to the apparatus frame, while the respective cylindrical measuring pins are alongside one another with their respective central axes parallel to one another,
a tracing structure (15) connected to said apparatus frame and comprising a first tracing point (21) and a second tracing point (22),
a driving structure (16A-16B), which is configured for effecting that in said simultaneous holding condition the first tracing point is performing a first joint tracing operation by tracing against and along respective first circular sections of the respective cylindrical outer surfaces of the respective cylindrical measuring pins in a first plane which is perpendicular to the central axes, and which is configured for effecting that in said simultaneous holding condition the second tracing point is performing a second joint tracing operation by tracing against and along respective second circular sections of the respective cylindrical outer surfaces of the respective cylindrical measuring pins in a second plane which is perpendicular to the central axes, wherein at least respective first parts of the respective first circular sections are diametrically opposite to at least respective second parts of the respective second circular sections, as seen relative to the respective central axes, a detecting structure (17A-17C), which is configured for detecting first relative positions of the first tracing point (21) relative to the apparatus frame (11), and which is configured for detecting second relative positions of the second tracing point (22) relative to the apparatus frame (11), a processor (18), which is configured for determining respective measured values of said respective diameters based on said detecting of said first relative positions of the first tracing point during said first joint tracing operation, and based on said detecting of said second relative positions of the second tracing point during said second joint tracing operation, and wherein the two-dimensional tracing apparatus is configured for:

effecting said simultaneous holding condition, performing said first joint tracing operation, performing said second joint tracing operation, determining, by said processor, said respective measured values of said respective diameters.

6. An apparatus according to claim 5, wherein the simultaneous holding structure (12) is an exchangeable module of the two-dimensional tracing apparatus (10) in that the simultaneous holding structure is detachable from the apparatus frame (11) and attachable to the apparatus frame (11) by a user of the two-dimensional tracing apparatus.

7. An apparatus according to claim 6, wherein the simultaneous holding structure (12) is configured such that:

the user can mount the respective cylindrical measuring pins (1A-1E) to the simultaneous holding structure when the simultaneous holding structure is detached from the apparatus frame (11), and said simultaneous holding condition is automatically effected when the user subsequently attaches the simultaneous holding structure, together with the respective cylindrical measuring pins (1A-1E) mounted thereto, to the apparatus frame (11).

8. An apparatus according to claim 5, wherein the position of the simultaneous holding structure (12) relative to the apparatus frame (11) is adjustable in an axial direction of the two-dimensional tracing apparatus (10), wherein said axial direction is defined as being parallel to said central axes (3A-3E), as seen in said simultaneous holding condition.

* * * * *